United States Patent [19]

Hasenbalg

[11] 3,875,331

[45] Apr. 1, 1975

[54] VECTOR TABLET DIGITIZING SYSTEM

[75] Inventor: Ralph D. Hasenbalg, Canoga Park, Calif.

[73] Assignee: Vector General, Inc., Canoga Park, Calif.

[22] Filed: Nov. 8, 1973

[21] Appl. No.: 413,773

[52] U.S. Cl............. 178/19, 178/18, 340/146.35 Y, 340/347 AD

[51] Int. Cl............................................. G08c 21/00

[58] Field of Search............ 340/146.35 Y, 347 AD; 178/18, 19, 20; 318/567, 568, 576, 615, 616; 235/61.6 A, 61.6 B, 197; 33/1 M; 35/9 C

[56] References Cited

UNITED STATES PATENTS

| | | | |
|---|---|---|---|
| 3,302,194 | 1/1967 | Green et. al. | 340/347 AD |
| 3,342,935 | 9/1967 | Leifer et al. | 340/146.3 SY |
| 3,591,718 | 7/1971 | Asano et al. | 178/19 |

*Primary Examiner*—Thomas A. Robinson

[57] ABSTRACT

An electrostatic digitizing system is provided, which includes an X, Y digital tablet and a stylus as a graphic input unit, which serves to digitize drawings, or the like, and which may be used in a variety of graphics applications and systems. The surface of the tablet emits a changing electrostatic field which is detected by the tip of the stylus. The field is time multiplexed to provide three necessary functions, which will be referred to as the X-axis digitize function, the Y-axis digitize function, and the pen near detect function. The circuitry to be described incorporates a potentiometric feedback system whereby the stylus senses only an error value. The circuitry is also such that attenuation at the stylus input does not directly affect the operation of the system. The embodiment of the system to be described is constructed to incorporate anti-toggle and over-scale features, as well as an adjustable margin feature.

10 Claims, 11 Drawing Figures

TIMING DIAGRAM

X-Coordinate Point Voltage

VECTOR TABLET DIGITIZING SYSTEM

BACKGROUND OF THE INVENTION

Digitizing tablet systems are known in which a tablet is provided that creates an electrostatic field, the field being detected by a stylus. However, the prior art systems have certain inherent drawbacks, in that the amplitude of the output signal is a function of the position of the stylus, and unless extreme care is taken, errors can be introduced into the outputs of the system. As described above, the improved system of the present invention utilizes a potentiometer feedback circuit so that the stylus senses only an error value, and the effect of the stylus position as it is moved towards and away from the plane of the tablet is reduced.

The tablet digitizing system of the invention can perform a variety of functions. For example, it can be used to digitize existing drawings, to edit old drawings, or to create new drawings. It can also serve the same functions as the prior art tracking balls, joy stick units, control dials, light pens, and the like.

The data tablet digitizing system of the invention includes an X, Y digital tablet, as mentioned above, and it utilizes the aforesaid potentiometric feedback circuitry for noise-free operation and for high accuracy at reasonable cost. In the embodiment to be described, the electronic portion of the system is separable from the tablet to allow convenient digitizing of large scale drawings. An over-scale output permits tablet edges to be used for function selections. Adjustable margins permit variable scaling and position adjustments.

DETAILED DESCRIPTION OF THE ILLUSTRATED EMBODIMENT

Figure 1:
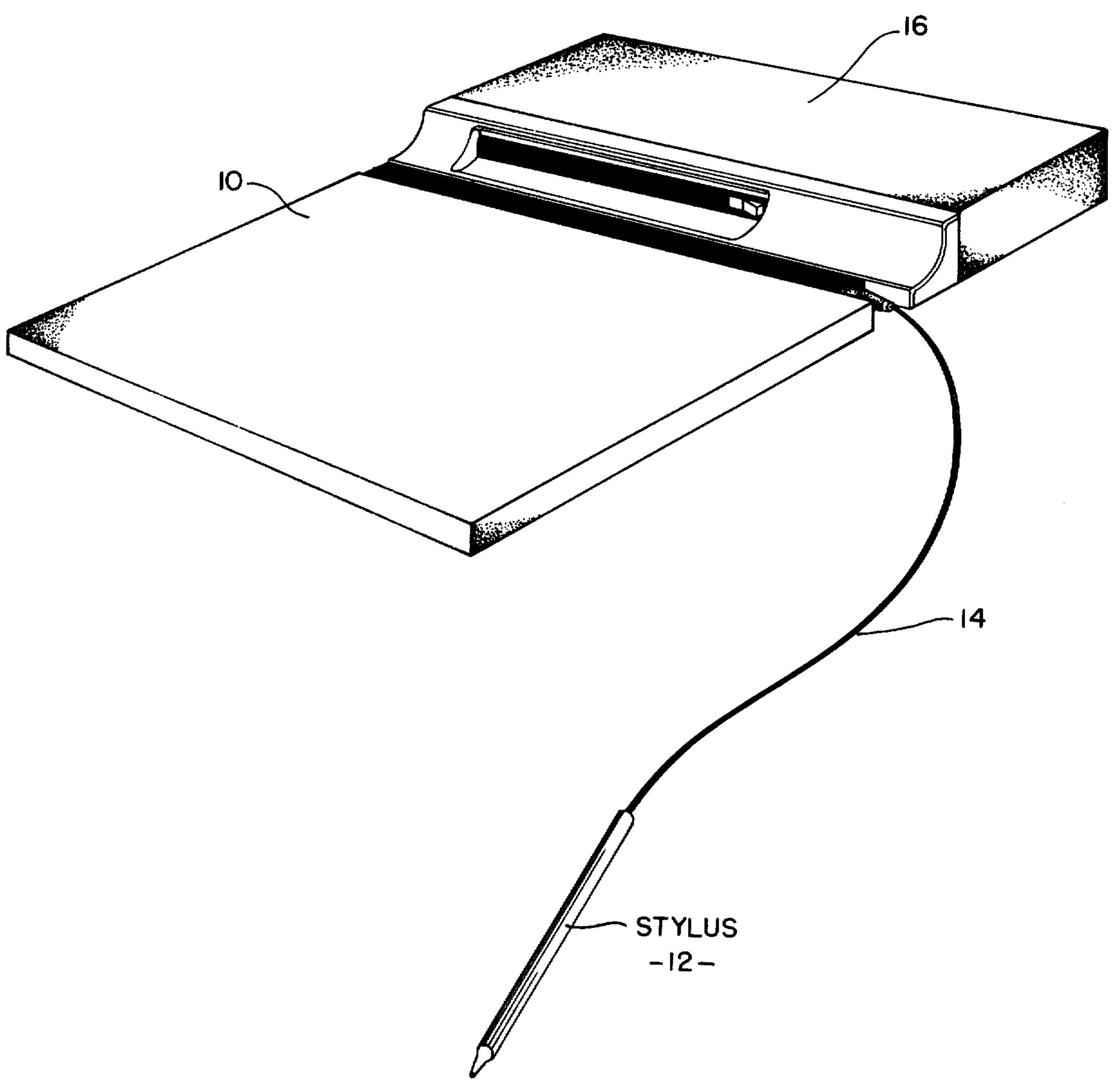
FIG. 1 is a perspective representation of a digital tablet and associated stylus, together with a housing which encases the electronic package of the invention.

As mentioned above, the representation of FIG. 1 includes a digital tablet 10 and a stylus 12. The stylus 12 is connected through an electric cord 14 to the electronic portion of the apparatus which is enclosed, for example, within the housing 16.

Figure 2:
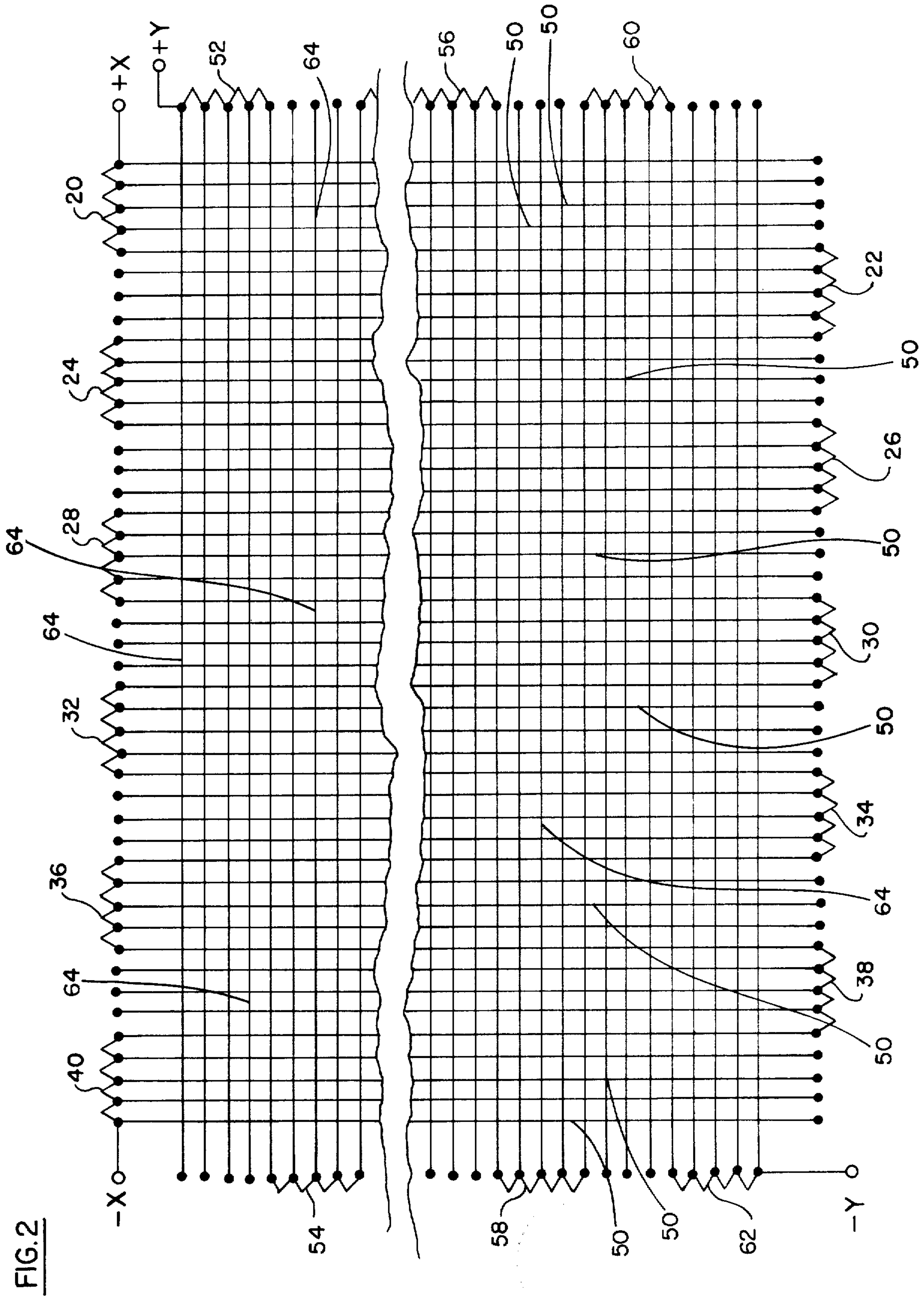
FIG. 2 is a plan view, somewhat schematically illustrating the electrical wiring associated with the digital tablet of FIG. 1.

As shown in FIG. 2, the digital tablet 10 includes, for example, input terminals designated −X and +X, and input terminals designated +Y and −Y. A series of resistors 20, 22, 24, 26, 28, 30, 32, 34, 36, 38 and 40 are connected between the terminals +X and −X. A plurality of wires 50 are inscribed on the under surface of the tablet 10 and extend across the tablet from one side of the other. Each of the wires 50 is connected to a corresponding tap on one of the resistors enumerated above. The wires 50 extend across the tablet in spaced parallel relationship with one another.

Likewise, a similar series of resistors, such as the resistors 52, 54, 56, 58, 60 and 62 are connected between the terminals +Y and −Y. A further plurality of electric wires 64 extend across the under surface of the tablet 10 in spaced, parallel relationship to one another, and at right angles to the wires 50. Each of the wires 64 is connected to a corresponding tap on the second series of resistors enumerated above.

In the operation of the system, the terminals +X and −X are first activated so that a current flow through the first series of resistors establishes each of the wires 50 at a particular potential level. This potential level is detected by the tip of the stylus 12 through electrostatic coupling with the wires 50, as the stylus is moved across the surface of the tablet 10. Then, the terminals +Y and −Y are activated so that a current flows through the second series of resistors, establishing the wires 64 at different potential values. These latter potential values are also detected by the stylus 12, as it is moved into contact with the surface of the tablet 10, and into electrostatic coupled relationship with the wires 64.

Figure 3:
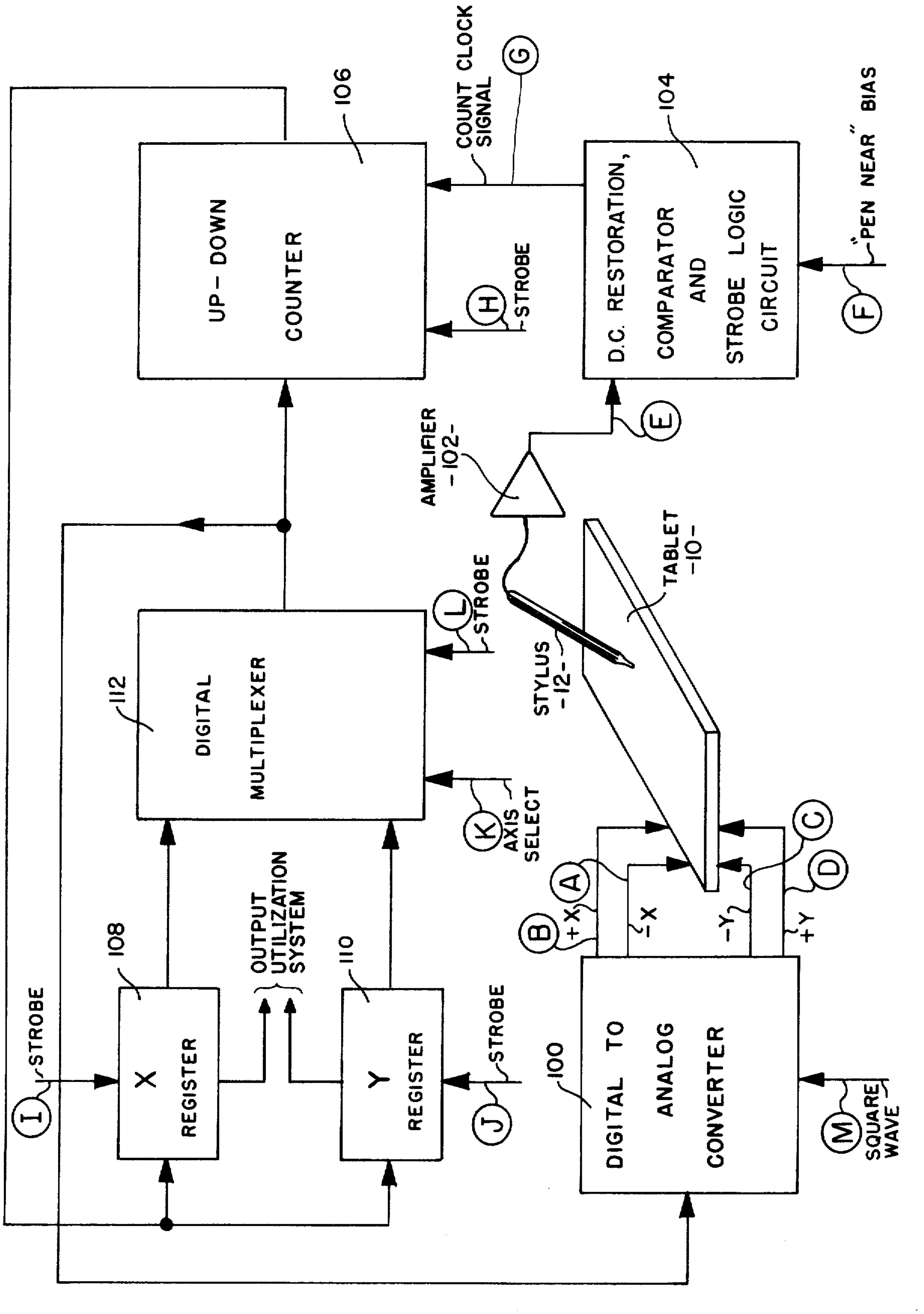
FIG. 3 is a block diagram of a system which embodies the invention in one of its aspects.

As shown in the block diagram of FIG. 3, the tablet 10 is activated by the +X and −X axis signals and by the +Y and −Y axis signals, these being derived from a digital-to-analog converter 100. The output of the stylus 12 is amplified in an amplifier 102, and the amplified signal is passed to a DC restoration, comparator and strobe logic circuit, represented by the block 104. A "Pen Near" bias F is introduced to the block 104, whereas a square wave M is introduced to the digital-to-analog converter 100.

The output of the block 104 is applied to an up-down counter 106 to set the counter for an up count or for a down count, when it is strobed by a suitable strobe signal. The output of the up-down counter 106 is applied to an X register 108, and to a Y register 110. The outputs of the registers 108 and 110 are applied to a digital multiplexer 112 whose output, in turn, is applied to the up-down counter 106, and to the digital-to-analog converter 100. Appropriate strobe signals I, J, L are applied to the registers 108 and 110, and to the digital multiplexer 112. Also, an axis select signal K is applied to the digital multiplexer 112.

Figure 4:
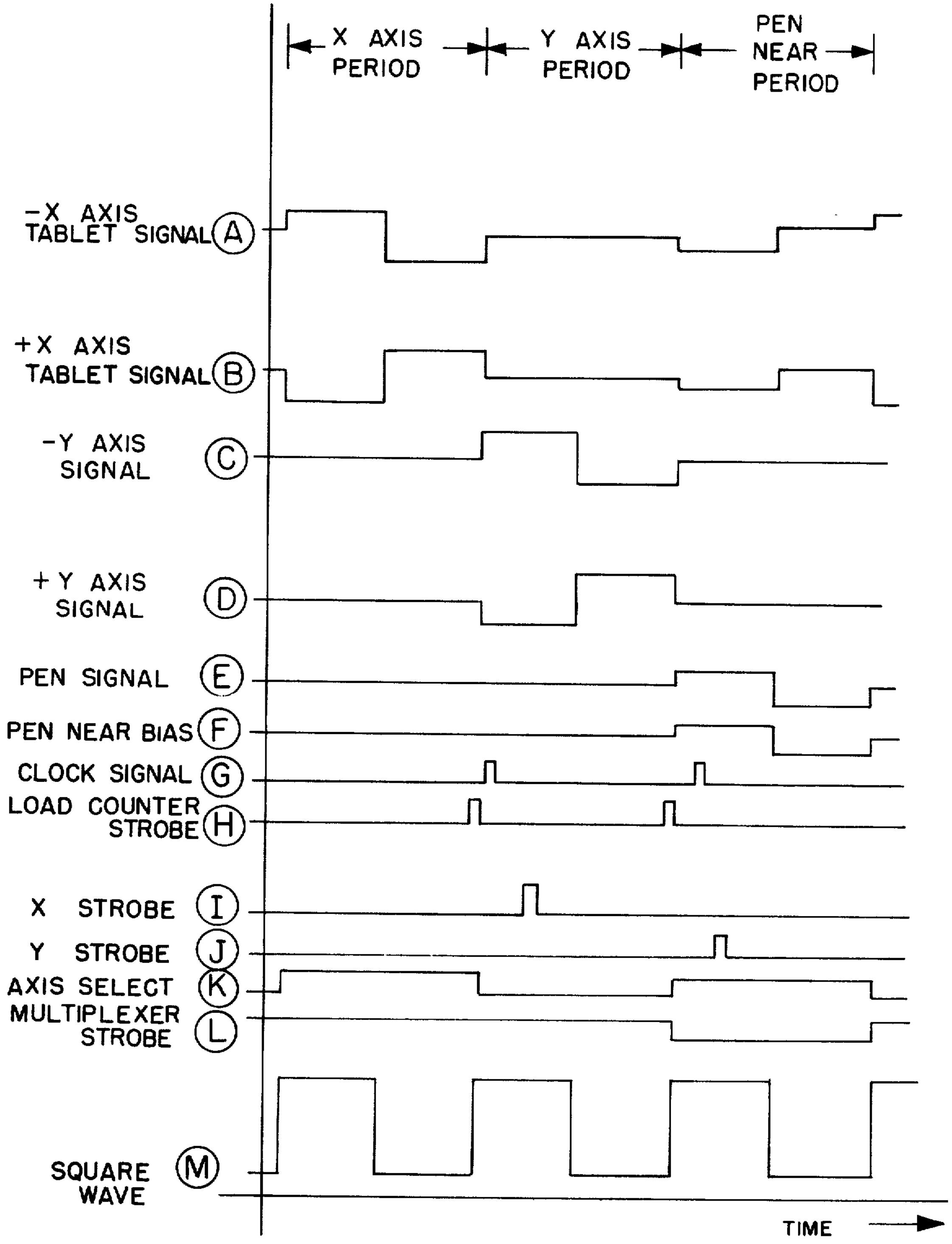
FIG. 4 is a timing diagram including a series of curves useful in explaining the operation of the system of FIG. 3.

The aforesaid signals are represented by the timing diagram of FIG. 4. During the operation of the system three periods occur which are repeated cyclically on a microsecond basis. These periods comprise the "X-axis period," the "Y-axis period," and the "Pen Near period." During the X-axis period, the −X tablet signal A is applied to the −X terminal of the tablet, and the +X tablet signal B is applied to the +X terminal of FIG. 2. These signals, as shown in the timing diagram of FIG. 4 are of opposite polarity. Then, during the Y-axis period, the −Y signal C is applied to the −Y terminal of FIG. 2 and the +Y signal D is applied to the +Y terminal of FIG. 2 with opposite polarity, as also shown in the timing diagram. Then, during the "Pen Near" period, the −X axis signal A and +X axis signal B are both applied with the same polarity to the −X terminal and +X terminal of FIG. 2.

The Pen Near bias F is applied with a predetermined polarity to the circuit 104 during the Pen Near period, and the signal E developed by the stylus 12, and amplified by the amplifier 102 must have sufficient amplitude to exceed the Pen Near bias before a Pen Near output signal will be generated.

The block 104 also produces a Load Counter strobe H which conditions the up-down counter 106 for an up count or a down count, under the control of the clock signal G. The X register is controlled by the strobe signal I, and the Y register is controlled by the strobe signal J. The Axis Select signal K applied to the digital multiplexer 112 has the waveform shown in FIG. 4, and the multiplexer strobe signal L also has the illustrated waveform. Finally, the square wave M applied to the digital-to-analog converter 100 has the illustrated waveform of FIG. 4.

As mentioned above, a potentiometer feedback circuit is used in the system to increase the accuracy and to provide the added features enumerated above. The surface of the tablet 10 emits a changing electrostatic field which is detected by the tip of the stylus 12. Time multiplexing of the electrostatic field provides the three necessary functions, namely, X-axis digitize, Y-axis digitize and Pen Near detect.

In the operation of the system, the output of the X register 108 is applied to the digital-to-analog converter 100 by the digital multiplexer 112 during each X-axis period. At the same time, a positive level of the square wave M is applied to the analog input of the digital-to-analog converter 100. Two outputs are obtained from the digital-to-analog converter, one being proportional to the negative value of the product of the amplitude of the square wave M and the digital input derived from the X register; and the other being proportional to the full scale output minus the product of the square wave amplitude and the digital input. The two outputs from the digital-to-analog converter 100 derived during each X-axis period may be represented as follows:

$$-X = -K_1(\text{sq.amp})\,[(\text{dig. value}) + (\text{max. dig. value})Km_1] \qquad (1)$$

$$+X = K_1(\text{sq.amp})\,[(\text{max. dig. value})\,(1+Km_2)-(\text{dig. value})] \qquad (2)$$

where:

+X is the voltage at the right edge of the tablet 10;
−X is the voltage at the left edge of the tablet;
$K_1$ is the max. gain from the sq. wave to the output of the surface driving amplifiers;
$Km_1$ is the left margin constant as a fraction of (sq. wave) (max. dig. value);
$Km_2$ is the right margin constant as a fraction of (sq. wave) (max. dig. value).

During the positive half-cycle of the square wave M, the direct current restoration circuit in the block 104 nulls the output from the stylus 12 to zero. The direct current restoration circuit is then disabled, and the square wave M changes to a negative value for the latter portion of each X-axis period. The voltage at the right hand side of the tablet (+X) now goes positive while the voltage at the left edge (−X) goes negative. During the latter half of the X-axis period, and during the negative half cycle of the M square wave, the up-down counter 106 is loaded with the value in the X register by way of the digital multiplexer 112, and under the control of the Load Counter signal H.

At the end of the X-axis period, the output from the comparator in the block 104 is strobed into a flip-flop indicating that the new stylus position is to be left or right of the old position. If a logic circuit (to be described) which prevents continuous toggling of the least significant bit does not inhibit the counter clock, the counter is stepped up or down one count. This new value is loaded into the X register by the X strobe I, if the strobe is not inhibited by an over-scale logic circuit, also to be described.

During the Y-axis period, the same functions occur to control and up-date the Y register 110. The X register 108 and Y register 110 are both connected to an appropriate output display, or to an appropriate utilization system, since the contents of the two registers represents the X-axis and Y-axis digitized values corresponding to the different stylus positions on the surface of the tablet.

Thus, a servo approach is utilized in the system to cause the values of the X register 108 and Y register 110 to track the positions of the stylus 12. At all stylus positions, a null field condition is generated at the stylus point, with the register contents being controlled by the servo circuitry to control the +X, −X and +Y, −Y values until a null is reached. That is, the voltages at the edges of the tablet change in opposite polarity and by amplitudes that make the change at the position of the stylus tip only an error value.

During each Pen Near period, the X-axis signals A and B appear at the −X terminal and +X terminal of FIG. 2 with the same amplitude and same polarity. The X voltage is positive during the first half-cycle of the Pen Near period, and negative during the second half-cycle. The Pen Near bias F introduced to the pen comparator circuit in the block 104 is adjustable to a predetermined level. If the amplitude of the stylus output signal E from the amplifier 102 exceeds the Pen Near bias amplitude for both of the half-cycles of all cycles during a time delay, a Pen Near output will be generated to inform the utilization means that the signals detected by the stylus are valid and should be processed. To prevent continuous changes in the Pen Near output when the stylus is at a threshold value, the Pen Near comparator bias level F is decreased when Pen Near is detected to produce a hysteresis effect.

If the up-down counter 106 is loaded with a full scale positive value from the X register 108 or Y register 110, and a TUP clock from the unit 104 causes a spillover into the next more significant bit, the register strobe I or J is then inhibited to prevent a wrap-around condition in the register. The same register Strobe Inhibit signal occurs when a full scale negative value is loaded into the up-down counter 106 and a TDN clock occurs from the unit 104. Thus the registers 108 and 110 lock at full-scale positive or negative values when an over-scale condition occurs. Two over-scale outputs, one for X and one for Y indicate when an over-scale condition is present.

A switch in the stylus 12 closes when pressure is applied to the point of the stylus. A level detector circuit senses the switch closure and supplies the pen pressure output.

Figure 5:
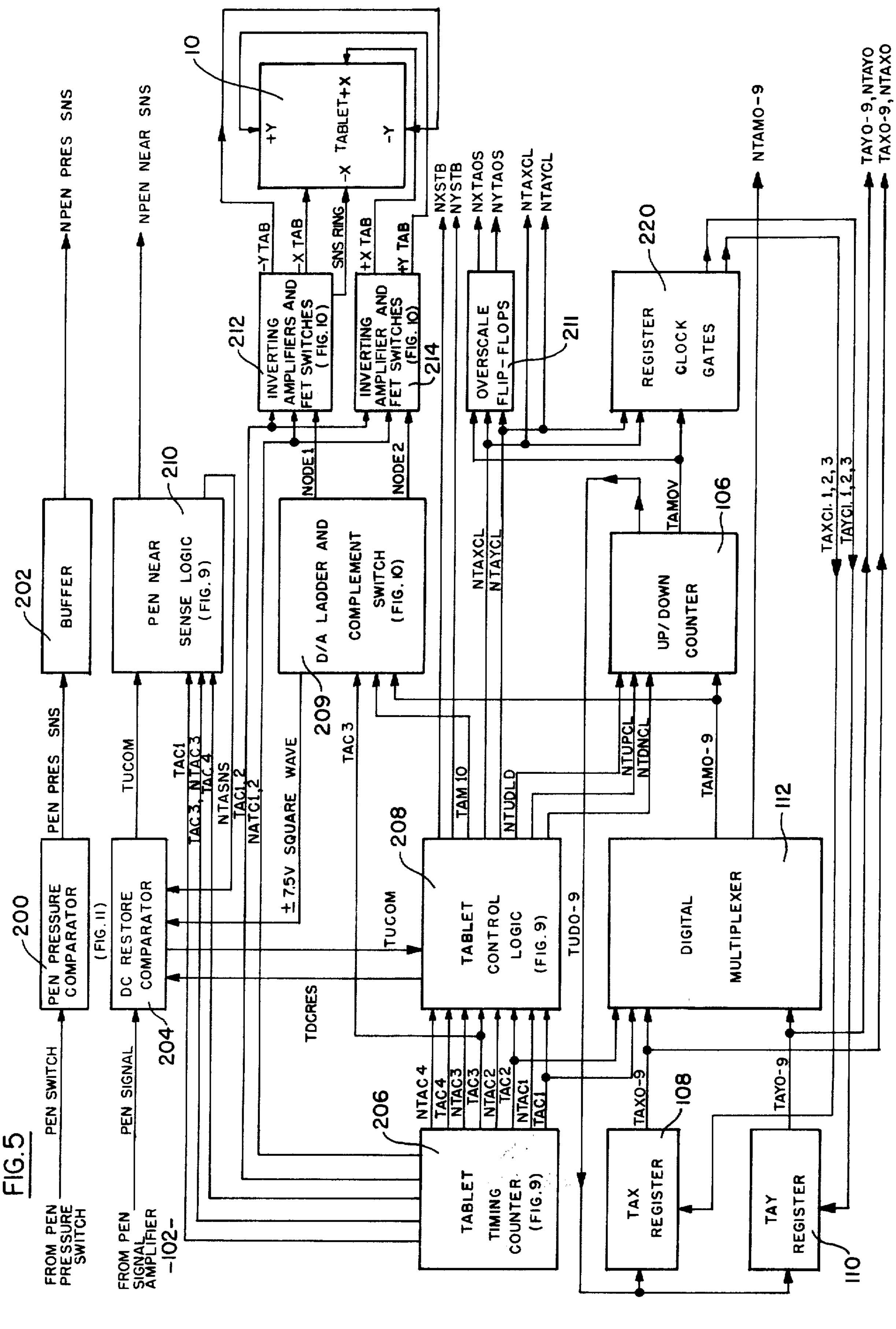
FIG. 5 is a more complete block diagram of the system.
Figure 11:
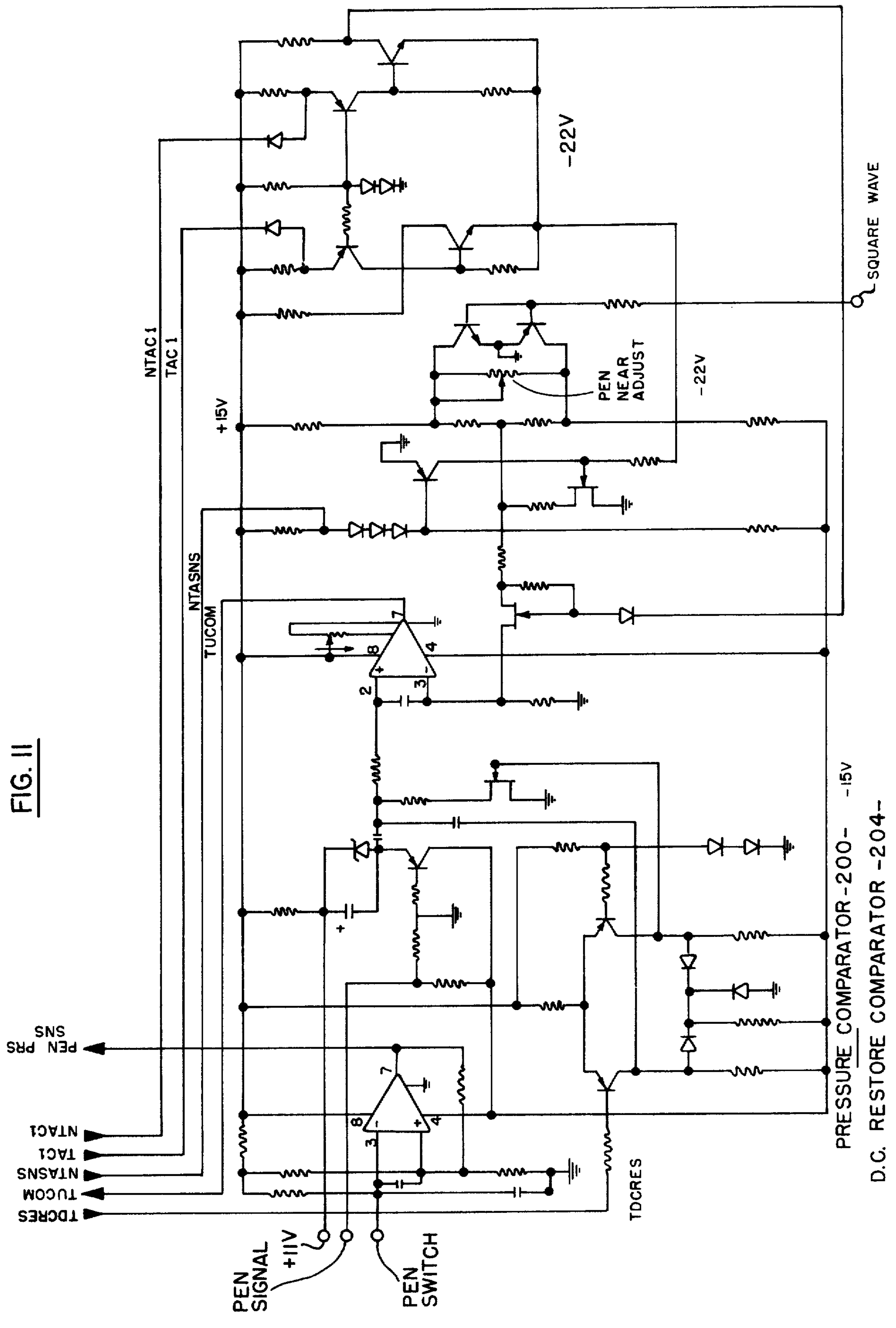

A more complete block diagram of the system is shown in FIG. 5 in which components similar to those previously shown in FIG. 3 are referred to by the same numbers. The system shown in FIG. 5 includes a pen pressure comparator 200 which responds to a signal when the stylus switch is closed, and which is connected to a buffer 202. The system also includes a direct current restoration comparator 204 which is included in the block 104 of FIG. 3. The signal from the amplifier 102 is applied to the comparator 204. The comparators 200 and 204 are shown in circuit detail in FIG. 11. The comparator 204 is connected to Pen Near sense logic represented by the block 210.

The system further includes a tablet timing counter 206 and tablet control logic 208 connected to a digital-to-analog ladder and complement switch represented by the block 209, and which is included in the block 100 of FIG. 3. The switch 209 is connected to the tablet 10 through inverting amplifiers and FET switches, represented by the block 212 and 214. The tablet control logic 208 is also connected to over-scale flip-flop represented by the block 211. The block 211, and the up-down counter 106 are connected to register clock gates 220. The various logic values developed in the system are represented in the diagram of FIG. 5. The Pen Near sense logic 210 is shown in more detail in FIG. 9, and the D/A logic 209 and associated amplifiers are shown in more detail in FIG. 10.

The tablet timing counter 206 is formed of four flip-flops TAC1-TAC4, and is used to generate the tablet cycle sense periods, the strobes, the register clocks, and the like. In the constructed embodiment, the duration of one complete tablet cycle is 150 microseconds.

The TAX register 108 is a 10-bit register consisting of eight flip-flops TAXO-TAX7, and two extension flip-flops to provide TAX8, TAX9 digital signals. The register contents are multiplexed by the digital multiplexer 112 and applied to the digital/analog converter blocks 209, 212 and 214 to produce the −XTAB and +XTAB voltages for the X-axis of the tablet 10. The digital output from the TAX register 108 is also loaded into the up-down counter 106 by way of the digital multiplexer 112, which is either incremented or decremented to make the corresponding register track the stylus position in a closed loop operation (TAMO-9).

The contents of the up-down counter 106 are then loaded back into the corresponding TAX register 108 or TAY register 110 (TUDO-9). If the up-down counter overflows or underflows, the register strobes are inhibited to prevent wrap-around of the register contents, as explained above, and, as a result, when an over-scale condition exists, the register contents remain unchanged, either full or empty.

The TAY register 110 provides TAYO-9 digital output signals which track the Y coordinate position of the stylus, and which are also applied to the digital multiplexer 112 for multiplexing with the corresponding digital output signals from the TAX register 108.

The digital multiplexer 112 passes the TAXO-9 signals to the digital/analog converter 209 and to the counter 106 during the X-period, and the TAYO-9 signals to the digital/analog converter and counter during the Y-period. During the Pen Near period, the TAMO-9 digital output signals from the multiplexer are forced to logical "one's" and applied to the digital-to-analog converter to produce the XTAB and SNS RING signals for the tablet 10.

The tablet control logic 208 develops the counter load (NTUDLD) and up-down strobe signals (NTUPCL, NTDNCL) for the up-down counter 106, the DC restore signal (TDCRES) for the comparator 204, and the strobe signals NTAXCL and NTAYCL for the registers 108 and 110. In addition, the tablet control logic supplies a supplemental bit, TAM10, to the digital/analog converter 209.

Since a closed loop system requires a detected error signal to null itself out, the system has a tendency to "hunt" when at the null value. The TAM10 signal, along with anti-toggle flip-flops, inhibit strobing of the counter and subsequent toggling of the register least significant bits. Instead, the TAM10 signal, with the same binary weight as the least significant bit TAM9, is toggled, and the registers maintain a steady binary value when at the null position.

For example, for anti-toggle logic operation in the X channel, the output of the TAXANT flip-flop is gated to drive the eleventh bit (TAM10) of the digital/analog converter during the X-axis time and prevents continuous toggling of the least significant bit (TAX9). If an up command is indicated by the TUP flip-flop and the TAXANT flip-flop is false, then the TUP strobe to the counter will be inhibited. Also, if a down command is indicated by the TUP flip-flop and the TAXANT flip-flop is true, the TDN strobe will be inhibited. Therefore, if the stylus is in a position where the change in the output of the digital/analog converter caused by the toggling of TAM10 on successive operating cycles causes alternate TUP and TDN commands, no change in the TAXO-9 output bits will occur. However, if the pen moves so that the TUP flip-flop is in the same state for two successive operating cycles, the counter 106 will be strobed and a new value will be fed into the X register. The operation for the Y sense period is the same.

The up-down counter 106 consists of a ten bit counter (TUDO-9) plus an overflow state (TAMOV). The counter is alternately loaded from the TAX and TAY registers 108, 110, and is then either incremented, decremented, or not strobed, depending on the state of the pen sense signal TUCOM and the states of the anti-toggle flip-flops, described above. The counter output is then loaded back into the appropriate TAX or TAY register to update its value. In the event of an overflow or underflow, the counter output TAMOV sets the appropriate over-scale flip-flops and inhibits the strobe to the corresponding register 108 or 110.

Figure 8:
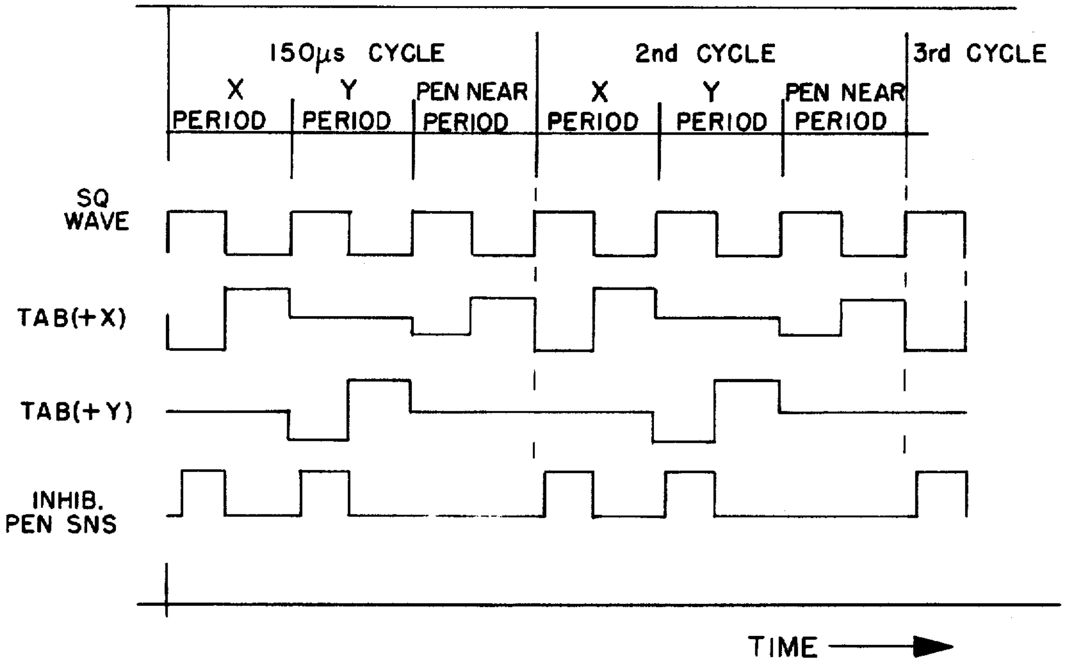
FIG. 8 is a series of curves useful in understanding the operation of the system.

The digital/analog ladder network in the block 209 provides the binary-weighted resistors which produce multiplication of the digital input value times the digital/analog reference value for the NOD1 and NOD2 signal outputs. Instead of utilizing a DC voltage for the digital/analog reference, the complementary switch alternately selects ±7.5 volts to provide the 20 KHz square wave reference M (FIGS. 4 and 8). The ladder resistors provide a gain of one-half full scale value for TAMO to 1/1024 full scale value for TAM9. The additional anti-toggle signal TAM10 has the same binary value as TAM9. During the Pen Near period, the TAMO-9 digital signals are forced to logical one's. However, the digital/analog three most significant bits are inhibited by TAC1 and results in a bit configuration for resistor selection to generate the SNS RING and XTAB signals for the tablet.

The inverting amplifiers and FET switches in the block 212 and 214 are part of the digital/analog converter. The block 212 receives the NOD1 output from the block 209 and provides tablet excitation voltages minus YTAB and minus XTAB proportional to the register digital value times the square wave value. Field effect transistors are used in the block to provide the switching required alternately to energize the X/Y axes and the sense ring. The circuitry of the block 212 also contains left X and bottom Y margin adjustment potentiometers.

The circuitry of the block 214 is the same as the circuitry of the block 212, except that the output tablet control voltages +XTAB and +YTAB are proportional to the logical zero's from the corresponding register multiplied by the square wave value. Only one inverting amplifier is used in the block 214 with the result that the +XTAB and +YTAB output voltages are of opposite polarity to the −YTAB and −XTAB output voltages, as is desired. The block 214 also includes right X and top Y margin adjustment potentiometers. The potentiometers adjust the portions of the square wave signal M which are added to the plus and minus outputs of the blocks 212 and 214 in each axis when the corresponding axis is active. Increasing the amount of the square wave summed with the output moves the margin towards the center. The four potentiometers allow setting any margin to any value within the range of the specification. The tablet is linear and accurate for all settings of the margin adjustments.

Six gates are used in the register clock gates of block 220 to generate the register clock or strobe signals, three for each of the TAX and TAY registers 108, 110. If an over-scale condition exists, the term TAMOV becomes high, and the strobes are inhibited, so that the contents of the up-down counter 106 are prevented from being loaded back into the corresponding register.

Two over-scale flip-flops are provided in the block 211 to generate low active X or Y over-scale signal outputs. If an over-scale condition exists in only one axis, that register value is set at either its upper or lower limit, depending on the over-scale condition, while the other register accurately tracks and reflects the stylus coordinate position on the corresponding axis.

The direction current restoration-comparator circuitry in the block 204 receives the stylus signal from the amplifier 102 and generates a digital tablet up signal (TUCOM) or a tablet down signal (NTUCOM) for the tablet control logic 208 and for the Pen Near sense logic 210. During the first half cycle of both the X and Y sense periods, the tablet DC restore signal (TDCRES) grounds the pen signal output and discharges the pen capacitors in preparation for detecting the pen X or Y sense signal during the second half cycle. The TUP flip-flop then sets at the end of the X or Y period if the comparator output TUCOM survives until that time. During the Pen Near sense period, an adjustable 20 KHz bias is applied to the comparator reference. When the pen output magnitude exceeds the reference bias on both half cycles of the Pen Near period, the TUCOM signal causes the Pen Near sense logic 210 to generate a Pen Near output signal. The Pen Near sense logic consists of three flip-flops TASNS1-3, and associated logic, to generate a low active NPEN NEAR SNS output when the pen is held close to the surface of the tablet 10.

When the pen pressure switch is activated as a result of contact of the point of the stylus 12 with the surface of the tablet 10, the pen pressure comparator 200 switches to provide a signal output which is buffered in the buffer 202 and which appears as a low active NPEN PRS SNS signal. The output signals from the buffer 202 and the Pen Near sense logic 210 are utilized by the apparatus activated by the system so that the apparatus will respond only at the appropriate times to the output signals from the system.

Figure 6:
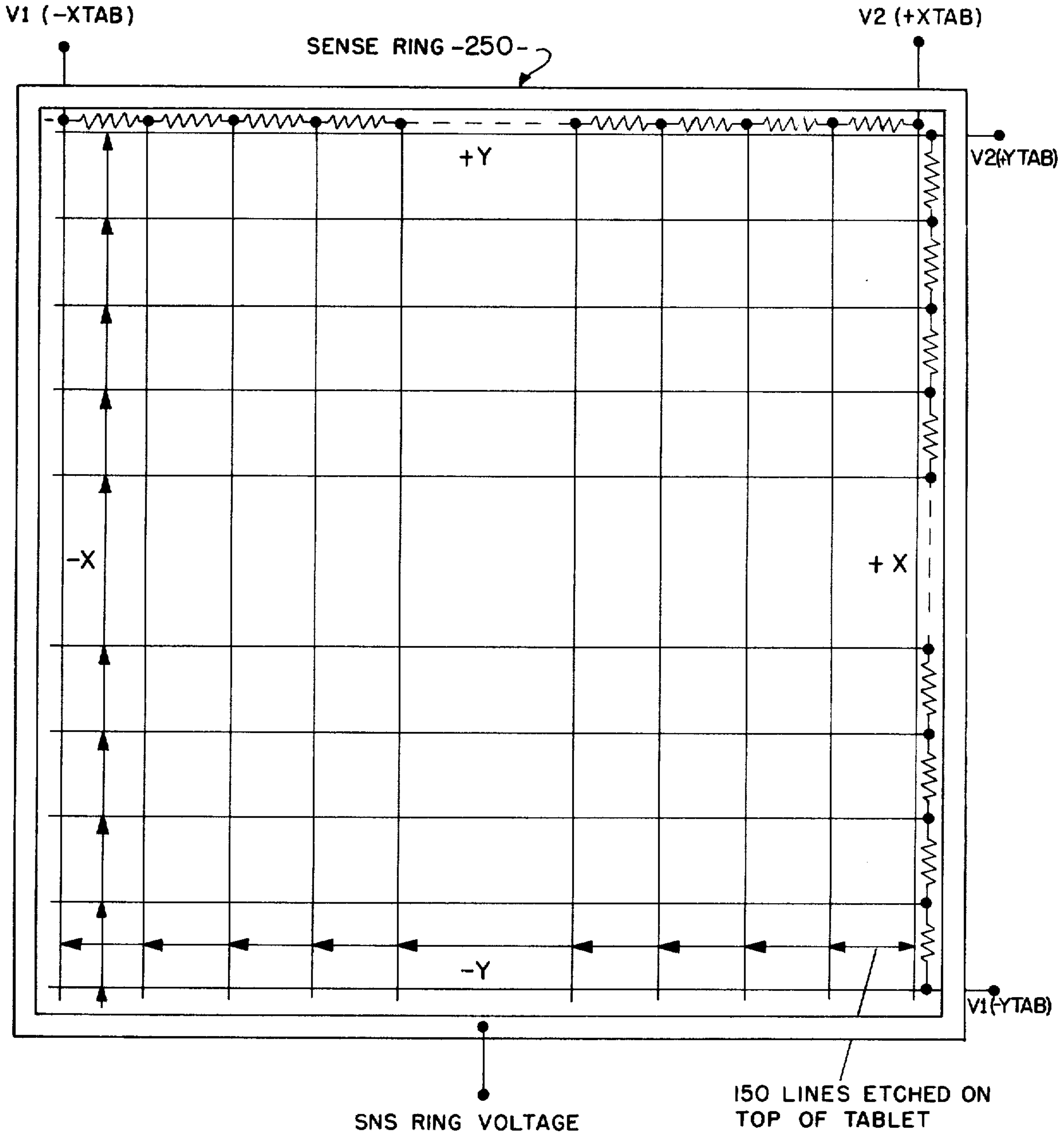
FIG. 6 is a further schematic representation of the tablet.

The data tablet shown schematically in FIG. 2 is also shown in a further schematic diagram of FIG. 6. The data tablet in a constructed embodiment contains 150 separated vertical wires etched on the top surface for generating pen sense signals in the X-axis. Each such wire is connected to its adjacent wire by a 20 ohm resistor to form a linear 2980 ohm resistance across the tablet X surface. The wires are spaced on 0.1 inch centers to provide an overall tablet X dimension of 14.9 inches. The bottom of the tablet contains identical etched wires and resistors for Y-axis sensing, as described above. A square 0.5 inch sense ring 250 is installed 0.1 inches beyond the outermost wires on both the top and bottom surfaces of the tablet. The purpose of the sense ring is to inhibit the Pen Near signal output when the stylus is positioned in the over-scale area outside of the X- and Y-surface limits.

Figure 7:
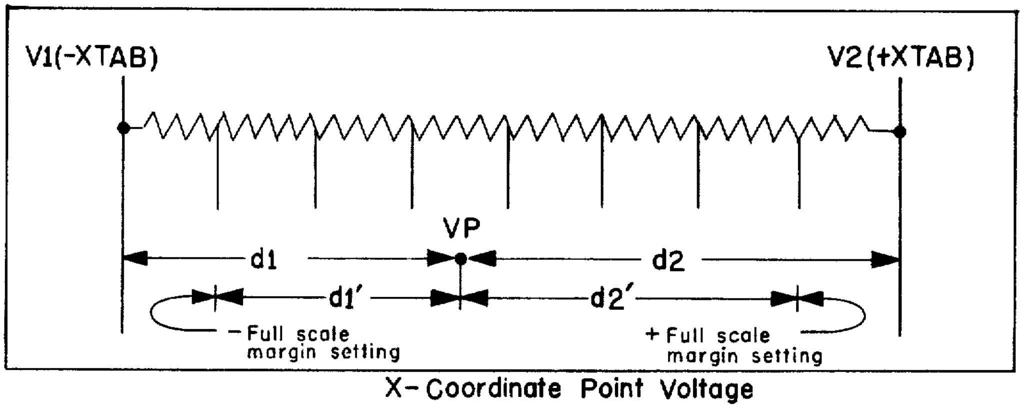
FIG. 7 is a circuit diagram representative of the tablet circuitry.

Reference is made to FIG. 7 for an analysis of the data tablet electrical operation. Since operation and voltage sensing of the X- and Y-axes are identical, only the X-axis aspect will be analyzed. The excitation voltages are shown in V1 and V2 in FIG. 7; the voltage at a given coordinate point is shown as VP: and X distances on the tablet surface are shown as *d*1 and *d*2.

The voltage sensed by the stylus (VP) is then determined by the following equation:

$$V_p = \text{KoK1(sq. wave)}/d1 + d2\ \{[(\text{dig. value}) + (\text{max. dig. value})\text{Km1}](-d2) + [(\text{max. dig. value}) - (\text{dig. value}) + (\text{max. dig. value})\text{Km2}]d2\} \quad (3)$$

where:

$V_p$ is the sensor input voltage;

Ko is the gain from the tablet surface to the sensor input.

The voltage form selected for V1 and V2 is the 20 KHz square wave output from the digital-to-analog converter to provide a step change which may be sensed more readily by capacitive coupling to the stylus sensor. The voltage V1 is the inverted output from the digital-to-analog converter whose amplitude is determined by the digital "1" bits; while the voltage V2 is the uninverted output whose amplitude is determined by the digital "0" bits. The outputs of the digital-to-analog converter (for the X-axis) are then as follows:

$$V1 = -K1(\text{sq.amp.})\ [(\text{dig. value}) + (\text{mas.dig.-value})\text{Km1}]. \quad (4)$$

$$V2 = K1(\text{sq.amp.})\ [(\text{max.dig.value})(1+\text{Km2}) - (\text{dig.-value})] \quad (5)$$

where values for the illustrated embodiment are approximately:

K1 = 1.0 sq. amp. = 7.5 volts dig. value = 0 to 1.0 depending on pen position max. dig. value = 1.0

Km1 = 0.0404 to 0.2904 depending on margin setting

Km2 = 0.0404 to 0.2904

In general, the potential across the tablet surface is in the order of 8.106V to 11.856V maximum, depending on the settings of the margin adjustment potentiometers. In any case, the −XTAB and +XTAB square waves are always of opposite potential. As a result, for any digital input to the D/A, a voltage null will always exist somewhere across the face of the tablet. For example, if the −XTAB square wave swings +/−4.133V while the +XTAB square wave swings −/+4.133V, the voltage potential at the zero X point in the center of the tablet is zero. At this time, the tablet X register value is at mid range. If the register value is zero, the voltage null appears at the −X side of the tablet and when the register is all "1's", the null is at the +X side.

The tablet circuitry is configured to keep the voltage at the sensed point (VP) at OV. This is accomplished by using the pen output drive the register in the appropriate direction, thereby adjusting the XTAB voltage potentials, until the voltage at the pen point coordinate nulls out. Thus, a servo process is used to make the register values track the pen position. This results in:

$$\frac{d1'}{31'+d2'} = \frac{d1 - \frac{(d1+d2)Km1}{1\ Km1+Km2}}{d1 - \frac{(d1+d2)Km1}{1+Km1+Km2} + d2 - \frac{(d1+d2)Km2}{1+Km1+Km2}}$$

$$= \frac{\text{dig. value}}{\text{max. dig. value}} \quad \ldots\ldots \qquad (6)$$

Since the distances d1′ and d2′ are offset by constant values from the *d*1 and *d*2 distances for any margin settings, the digital value of the register is linearly related to the distance *d*1′ and does not depend on the magnitude of the square wave or the attenuation at the pen sensor input.

As explained above, the stylus 12 uses capacitive sensing to detect the changing electrostatic field at the surface of the tablet 10. The signal sensed by the capacitive pick-up in the stylus is amplified by the preamplifier 102 and passed on to the direct current restoration and comparator 204 of FIG. 5 to generate a TUCOM signal. The presence of the TUCOM signal, if it survives for the required amount of time, increments the up-down counter 106 which increases or decreases the value of the corresponding register 108 or 110 until a voltage null exists at the pen coordinate position. The presence of the TUCOM signal results in the counter being incremented, and the presence of its complement NTUCOM results in the counter being decremented, so as to achieve the null point. The stylus 12 also includes a pressure switch, as mentioned above, which is activated by its point pressure against the tablet surface, and which is applied to the comparator 200 of FIG. 5 to provide a discrete PEN PRS SNS output signal.

As also explained above, the system utilizes a repetitive 150 microsecond sense cycle which is divided into three separate sense periods so that the system may sequentially sense the X-channel, the Y-channel, and the Pen Near conditions. The logic of the system requires a minimum of two consecutive pen sense "up" (TUCOM) signals, or two consecutive "down" (NTUCOM) signals, as shown by the curves of FIG. 8 to generate an up or down strobe and update the registers 108, 110 to the current stylus coordinate position value.

As also pointed out above, during the first half of each of the X- and Y-periods, the output of the stylus is inhibited by a direct-current restoration signal (TDCRES). During the second half of each of the X- and Y-periods, the first TUCOM signal sets a TUP flip-flop in the tablet control logic 208 which, in turn, sets an anti-toggle flip-flop TAXANT. During the following X- or Y-period, if the TUCOM signal is again high, the TUP flip-flop is again set and the counter 106 is incremented to increase the value of the corresponding X or Y register one bit. Each successive TUCOM high signal then continues to increment the counter and the corresponding register. In the same way, if the TUCOM signal is low for two successive periods, the TAXANT flip-flop is re-set, and the counter 106 is decremented to decrease the corresponding register. The purpose and operation of the anti-toggle logic circuit has been described previously. If the TUCOM signal is low during the first half and high during the second half of the Pen Near sense period, flip-flops are set in the Pen Near sense logic 210 which, in turn, activate the NPEN NEAR SNS output signal.

Figure 9:
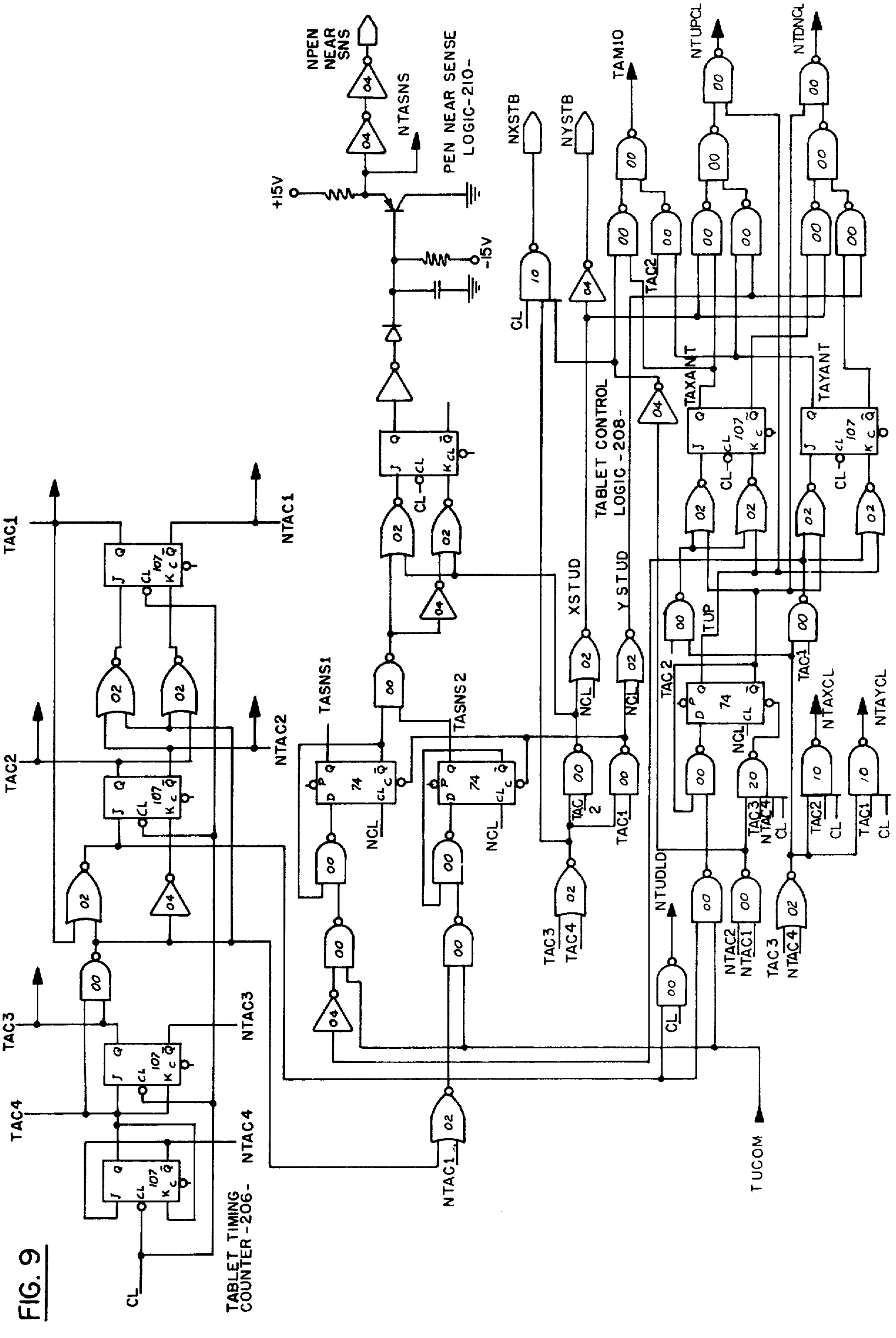
FIG. 9 is a logic circuit diagram of certain of the components of the system.

The tablet timing counter 206, the tablet control logic 208, and the Pen Near sense logic 210 are shown in logic detail in FIG. 9. The digital/analog ladder and complement switching network 209, the inverting amplifier 212, and the inverting amplifier 214 are all shown in simplified schematic detail in FIG. 10. The pen pressure comparator 200 and DC restore comparator 204 are shown in circuit detail in FIG. 11.

As shown in FIG. 9, the timing of the system is under the control of a four stage, modified cyclic counter (TAC1-TAC4) which completes one cycle for the system in 150 microseconds. The counter is decoded to divide the operational cycle into three sense periods, as follows:

| | |
|---|---|
| NTAC1.NTAC2. | = X period |
| TAC2. | = Y period |
| TAC1. | = Pen Near Period |
| NTAC2. | = X and Pen Near Periods |
| NTAC1. | = X and Y periods. |

Figure 10:
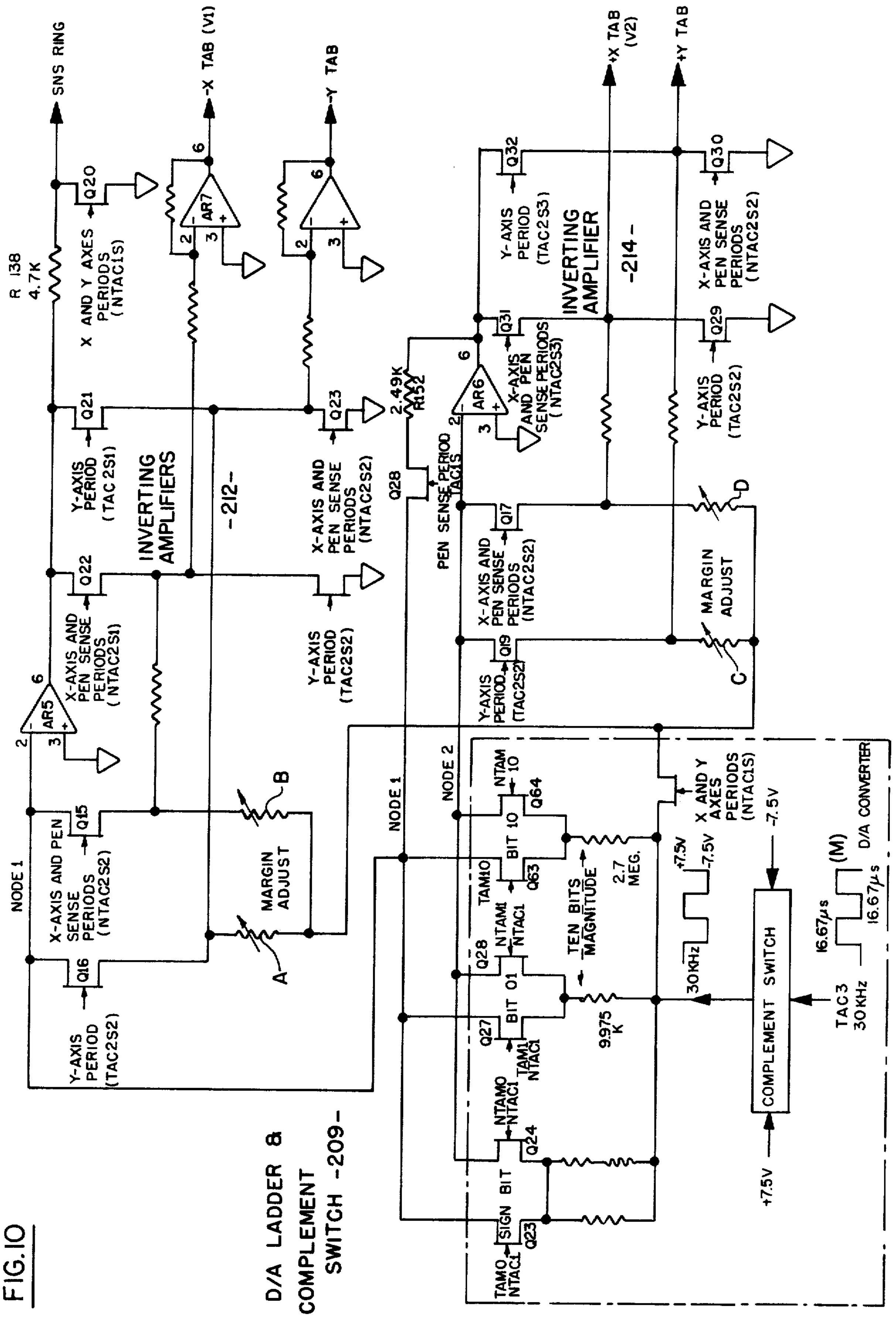
FIGS. 10 and 11 are schematic diagrams of other electronic components of the system.

The digital/analog converter, as illustrated in FIG. 10 is configured to receive digital data from the registers 108 and 110 by way of the multiplexer 112 to provide two simultaneous complementary analog outputs. During the X period, the digital inputs received from the TAX register 108, by way of the digital multiplexer 112, causes the circuit to generate the −XTAB and +XTAB voltages for the X-axis excitation of the tablet 10. During the Y period, the digital inputs received from the TAY register 110 by way of the digital multiplexer 112, cause the system to generate the −YTAB and +YTAB voltages for the Y-axis excitation of the tablet. During the Pen Near period, the digital inputs are forced to one's, and the circuit generates the −XTAB and +XTAB voltages for the X-axis. At the same time, the SNS RING voltage is applied to the tablet sense ring to inhibit the NPEN NEAR SNS signal output when the pen is positioned in those areas.

The digital/analog converter uses the 20KHz ± 7.5 volt square wave (M) for its voltage reference. This results in 180° out-of-phase outputs with a maximum potential difference of 11.838V between the minus and plus TAB outputs. The −XTAB and −YTAB signals are applied to the −X and −Y terminals of the tablet respectively and are in phase with the square wave reference M; while the +XTAB and +YTAB signals are applied to the +X and +Y terminals, and are 180° out-of-phase with the −XTAB and −YTAB signals. That is, during the X or Y periods, when the voltage potential at one terminal of the tablet is positive, the potential at the opposite terminal is negative.

In essence, the digital/analog converter consists of a pair of operational amplifiers AR5 and AR6, with feedback resistors, one for each channel, and a combination of input resistors. During the X period, digital input signals TAMO-9 representing the contents of the TAX register 108, control the FET switches Q23-Q64 in the resistance ladder network. At the same time, the FET switches select the X-axis operational amplifier feedback resistors, select the X-margin adjust circuits, connect the amplifier outputs to the −XTAB and +XTAB signal lines, and ground the YTAB and SNS RING outputs to the tablet.

The current to NOD1 is determined by the selection of a combination of input resistors as a result of logical one inputs while the current to NOD2 is determined by the input resistors selected by the logical zero inputs.

The inverted outputs of the operational amplifiers stabilize at a value such that their feedback currents through the 4.49K resistors equals the current through the selected input resistors connected to the nodes, thus driving the node potentials close to OV. This then satisfies the equation for establishing the tablet excitation voltage values. The feedback resistors and the ladder resistor values, without the margin adjust circuits, would provide an amplifier scale factor of 1, however, the output voltages are offset by a value of 0.302V to 2.169V, depending on the setting of the margin adjust potentiometers A, B, C, D.

The resistance values of the ladder in FIG. 10 are binary weighted such that bit TAMO (MSB) results in a gain of ½ full scale, TAM1 with a gain of ¼ full scale. Since the current through the feedback resistor to NOD1 must equal the sum of the current through the selected input resistors, the gain of the amplifier is the sum of the binary values of the ladder resistors selected by the FET switches closed by logical one's.

Maximum output is achieved when TAMO-9 are set to one's. The output is then 1 - 1/1024 times the square wave amplitude times K, or effectively ± 7.802 to 9.669V, depending on the setting of the margin potentiometer. At the same time, the +XTAB voltage level, as a result of no digital zero's input, and margin adjust current only to NODE 2, is in the order of 0.302 to 2.169V, and is opposite in polarity to the −XTAB signal voltage. When the TAMO-9 inputs are all zero's, the ±XTAB voltage values are reversed.

While a particular embodiment of the invention has been shown and described, modifications may be made. It is intended in the following claims to cover all the modifications that come within the spirit and scope of the invention.

APPENDIX

LOGIC TERMS AND EQUATIONS

| Term | Equation | Description |
|---|---|---|
| CL1 | | Buffered 80 KHz data tablet clock. |
| CL2 | | Buffered 80 KHz data tablet clock. |
| CL3 | | Buffered 80 KHz data tablet clock. |
| NCL | | Inverter 80 KHz data tablet clock. |
| NODE 1 | | Node of operational amplifier AR5 for −XTAB and −YTAB signals. |
| NODE 2 | | Node of operational amplifier AR6 for +XTAB and +YTAB signals. |
| N PEN NEAR SNS1 | | Low-active pen near signal output to LED. |
| N PEN NEAR SNS2 | | Low-active pen near signal output. |
| PEN PRS SNS | | Output of pen pressure switch comparator. |
| NPEN PRS SNS1 | | Low-active pen pressure signal to LED. |
| NPEN PRS SNS2 | | Low-active pen pressure signal output. |
| SNS RING | | +/−1.319V square wave to tablet sense ring. |
| TAC4 | | Tablet counter LSB flip-flop (40 KHz) |
| | J = NTAC4CL1. | Toggled by 12.5 $\mu$ s clock |
| | K = TAC4.CL1. | Toggled by 12.5 $\mu$ s clock |
| TAC3 | | Tablet counter 2nd LSB flip-flop (20 KHz). |
| | J = NTAC3.TAC4.CL1. | Follow TAC4. |
| | K = TAC3.TAC4.CL1. | Follow TAC4. |
| TAC2 | | Tablet counter Y-period flip-flop. |
| | J = NTAC1.NTAC2.TAC3.TAC4.CL1. | Start Y-sense period. |
| | K = TAC2.TAC3.TAC4.CL1. | End Y-sense period. |

LOGIC TERMS AND EQUATIONS

| Term | Equation | Description |
|---|---|---|
| TAC1 | | Tablet pen-sense period flip-flop. |
| | J = NTAC1.TAC2.TAC2.TAC4.CL1 | Start pen-sense period. |
| | K = TAC1.NTAC2.TAC3.TAC4.CL1. | End pen-sense period. |
| TAC1S | | FET switch gate signal. |
| | = TAC1. | Pen-sense period. When high, turns on FET 28 to apply AR6 output to NODE 1 for SNS RING and – outputs to tablet. |
| NTAC1S. | | X or Y sense period. |
| | = NTAC1. | When high, grounds SNS RING output and applies ±7.5V square wave to margin adjust circuits. |
| TAC2S | | Y-sense control signal for FET gates. |
| | = TAC2. | Y-sense period, generate TAC2S1, 2, and 3. |
| TAC2S1 | | When high, turns on |
| | = TAC2S. | Q21 to provide AR5 output to inverter AR8 and connect feedback resistor R133 to NODE 1. |
| TAC2S2 | | Y-sense control signal. |
| | = TAC2S | When high, turns on FETs Q18 and Q19 to connect Y margin circuits and feedback for AR5 and AR6. Also closes FETs Q22 and Q29 to ground + and – outputs. |
| TAC2S3 | | Y-sense control signal. |
| | = TAC2S. | When high, turns on FET Q23 to provide +YTAB signal output. |
| NTAC2S | | X-axis and pen-sense periods. |
| | = NTAC2. | When high, generate NTAC2S1, 2, and 3. |
| NTAC2S1 | | X-axis and pen-sense periods. |
| | = NTAC2S. | When high, turns on Q22 to provide AR5 output to inverter AR7 and connect feedback resistor R122 to NODE 1. |
| NTAC2S2 | | X-axis and pen-sense period. |
| | = NTAC2S. | When high, turns on FETs Q15 and Q17 to connect X margin circuits and feedback for AR5 and AR6. Also closes FETs Q23 and Q30 to ground + and – outputs. |
| NTAC2S3 | | X-axis and pen-sense period. |
| | = NTAC2S | When high, turns on Q31 to provide +XTAB signal output and feedback resistor R130 to NODE 2. |
| TAMOV | | Tablet counter overflow signal. When high, indicates a counter overflow or underflow condition and inhibits the register clocks and set appropriate overscale flip-flop. |
| TAM0-9 | | Multiplexer output signals. |
| | = TAX0-9.NTAC1.NTAC2. | Select TAX REG outputs for counter inputting and multiplexer outputs (NTAM0-9). |
| | + TAY0-9.NTAC1.TAC2. | Select TAY REG outputs for counter inputting and multiplexer outputs (NTAM0-9). |
| NTAM0-9 | | Low-active multiplexer signal outputs. |
| TAM10 | | Anti-toggle control signal to DAC (binary weight of 1/1023 full scale). |

LOGIC TERMS AND EQUATIONS

| Term | Equation | Description |
|---|---|---|
| | = TAXANT.NTAC1.NTAC2. | X-sense period, increase D/A output by 7.3 MV. |
| | + TAYANT.TAC2. | Y-esense period, increase D/A output by 7.3 MV. |
| TASNS1 | | Pen-sense flip-flop No. 1 |
| | SET = TUCOM.TAC1.NTAC3.TAC4.NCL | Set during pen period of no pen-sense (TUCOM high during 1st half cycle). |
| | + TASNS1.NCL | Hold set until sampled by TASNS3. |
| | RESET = TAC1.NTAC3.NTAC4. | Reset after resetting TASNS3. |
| TAXNS2 | | Pen-sense flip-flop No. 2. |
| | SET = TUCOM.TAC1.TAC2.TAC4.NCL. | Pen-sense condition (TUCOM high during 2nd half of pen period). |
| | + TASNS2.NCL. | Hold until sampled by TASNS3. |
| | RESET = TAC1.NTAC3.NTAC4. | Reset after sampling by TASNS3. |
| TASNS3 | | Pen-sense flip-flop No. 3. |
| | J = NTASNS1.TASNS2.TAC2.NTAC3. NTAC4.CL3. | Pen sense condition, activate N PEN NEAR SNS signals after 50 MS. |
| | K = TASNS1.TAC2.NTAC3.NTAC4.CL3. | Reset for no-sense condition. |
| | + NTASNS2.TAC2.NTAC3.-NTAC4.CL3. | Reset for no-sense condition. |
| TAX0-9 | | Data table X register outputs. |
| TAXANT | | X anti-toggle flip-flop. |
| | J = TUP.TAC2.NTAC3.TAC4.CL3. | TUCOM at end of X-period, generate NTUPCL to increment counter if TUP during next X-period. |
| | K = NTUP.TAC2.NTAC3.TAC4.CL3. | No TUCOM at end of X-erpiod, generate NTDNCL to decrement counter if NTUP during next X-period. |
| NTAXCL | | Low-active X REG clock. |
| | = TAC2.NTAC3.TAC4.CL2. | Generate TAXCL to load TAX REG from counter if no TAMOV. |
| TAXCL1 | | TAX REG clock. |
| | = TAXCL.NTAMOV. | Load TAX REG from counter. |
| TAXCL2 | | TAX REG clock. |
| | = TAXCL.NTAMOV. | Relieve TAXCL1. |
| TAXCL3 | | TAX REG clock. |
| | = TAXCL.NTAMOV. | Relieve TAXCL1. |
| TAY0-9 | | Data tablet Y register outputs. |
| TAYANT | | Y anti-toggle flip-flop. |
| | J = TUP.TAC1.NTAC3.TAC4.CL3. | TUCOM at end of Y-period, generate NTUPCL to increment counter if TUP during next Y-period. |
| | K = NTUP.TAC1.NTAC3.TAC4.CL3. | No TUCOM at end of Y-period, generate NTDNCL to decrement counter if NTUP during next Y-period. |
| NTAYCL | | Low-active Y REG clock. |
| | = TAC1.NTAC3.TAC4.CL2. | Generate TAYCL to load TAY REG from counter if no TAMOV. |
| TAYCL1 | | TAY REG clock. |
| | = TAYCL.NTAMOV. | Load TAY REG from counter. |
| TAYCL2 | | TAY REG clock. |
| | = TAYCL.NTAMOV. | Relieve TAYCL1. |
| TAYCL3 | | TAY REG clock. |
| | = TAYCL.NTAMOV | Relieve TAYCL1. |
| TCL | | Data tablet 80 KHz clock. In phase with CL1, CL2, and CL3. |

APPENDIX – Continued

LOGIC TERMS AND EQUATIONS

| Term | Equation | Description |
|---|---|---|
| TDCRES | | Tablet DC restore signal. |
| | = NTAC1.NTAC3.CL2 | Restore pen capacitor potential to zero during X and Y periods. |
| | + NTAC1.NTAC3.TAC4 | Restore pen capacitor potential to zero during X and Y periods. |
| NTDNCL | | Tablet counter down clock. |
| | = NTUP.NTAXANT.TAC2.NTAC3. = NTAC4.CL. | Two successive X-sense down clocks, decrement counter X coordinate value. |
| | + NTUP.NTAYANT.TAC1.NTAC3. NTAC4.CL. | Two successive Y-sense down clocks, decrement counter Y coordinate value. |
| TUCOM | | Pen sense comparator output signal (reference timing diagram). |
| NTUDLD | | Tablet counter load signal. |
| | = NTAC1.TAC3.TAC4.CL2. | Load TAMO-9 multiplexer outputs into counter. |
| TUDO-9 | | Tablet counter outputs signals TUDO is MSB. |
| TUP | | Tablet up-count flip-flop. |
| SET | = TUCOM.NTAC1.TAC3.TAC4.NCL. | X or Y up-count condition detected. |
| | + TUP.NCL. | Hold until up-clock is generated. |
| RESET | = TAC2.TAC3.NTAC4.CL2. | Reset after X-sense. |
| | + TAC1.TAC3.NTAC4.CL2. | Reset after Y-sense. |
| NTUPCL | | Tablet counter up clock. |
| | =TUP.TAXANT.TAC2.NTAC3. NTAC4.CL. | Two successive X-sense up clocks, increment counter X coordinate value. |
| | + TUP.TAYANT.TAC1.NTAC3. NTAC4.CL. | Two successive Y-sense up clocks, increment counter Y coordinate value. |
| NXSTB | | Tablet X output strobe. |
| | = NTAC1.NTAC2.NTAC3.NTAC4.CL2. | X register data on TAMO-9 multiplexer output lines. |
| XSTUD | | X U/D counter strobe. |
| | = TAC2.NTAC3.NTAC4.CL. | Generate up clock if TUP.TAXANT or down clock of NTUP.NTAXANT. |
| NXTAOS | | X overscale output signal. |
| SET | = TAMOV.TAXCL. | Overflow condition. |
| RESET | = NTAMOV.TAXCL. | No overflow condition. |
| +XTAB | | X output signal to tablet –X axis. |
| –XTAB | | X output signal to tablet –X axis. |
| NYSTB | | Tablet Y output strobe. |
| | = TAC2.NTAC3.NTAC4.CL. | Y register data on TAMO-9 multiplexer output lines. |
| YSTUD | | Y U/D counter strobe. |
| | = TAC1.NTAC3.NTAC4.CL. | Generate up clock if TUP.TAYANT or down clock if NTUP.NTAYANT. |
| NYTAOS | | Y overscale output signal. |
| SET | = TAMOV.TAYCL. | Overflow condition. |
| RESET | = NTAMOV.TAYCL. | No overflow condition. |
| +YTAB | | Y output signal to tablet +Y axis. |
| –YTAB | | Y output signal to tablet –Y axis. |

What is claimed is:

1. An electrostatic digitizing system comprising: an X-Y digital tablet providing a changing electrostatic field over a plane surface; a stylus movable over the plane surface of the tablet and capacitively coupled thereto for detecting the electrostatic field at predetermined X,Y coordinates; first circuitry including an X register and a Y register and connected to said tablet for producing exciting potentials therefor so as to create said field; and second circuitry coupled to said stylus and to said first circuitry and including a counter for controlling the digital contents of the registers in accordance with the position of the stylus on the tablet surface and for controlling said exciting potentials as a function of the position of the stylus on said surface.

2. The electrostatic digitizing system defined in claim 1, in which said digital tablet includes a first series of electric wires extending in spaced and parallel relationship across the plane surface; first resistor means interconnecting the wires of the first series; means for introducing a first exciting potential across said first resistor means; a second series of wires extending across the surface in spaced and parallel relationship at right angles to the wires of the first series; second resistor means interconnecting the wires of the second series; and means for introducing a second exciting potential across said second resistor means.

3. The electrostatic digitizing system defined in claim 2, and which includes a conductive ring mounted on said surface and surrounding the wires of the first and second series and spaced outwardly therefrom; and circuit means for introducing a voltage to the conductive ring to cause the ring to inhibit the output of the stylus when the stylus is positioned outside the limits of the wires of the first and second series.

4. The electrostatic digitizing system defined in claim 1, in which said first circuitry includes time multiplexing means connected to said counter for causing the counter to control the digital contents of the register on a time multiplex basis.

5. The electrostatic digitizing system defined in claim 1, in which said first circuitry includes a digital/analog converter for converting the digital contents of the registers into corresponding analog exciting potentials for application to the tablet.

6. The electrostatic digitizing system defined in claim 1, in which said second circuitry includes logic circuit means for producing an output signal when the stylus is brought within a predetermined distance of the surface of said tablet.

7. The electrostatic digitizing system defined in claim 1, in which said first circuit means includes manually adjustable potentiometer means effectively to adjust the margin of the surface of the tablet.

8. The electrostatic digitizing system defined in claim 1, and which includes an over-scale logic circuit connected to said counter to inhibit the control of either of said X and Y registers when the corresponding register is either full or empty.

9. The electrostatic digitizing system defined in claim 1, and which includes an anti-toggle circuit connected to said counter to inhibit the control of the least significant bit of the contents of either the X or Y registers when a null condition is approached.

10. An electrostatic digitizing system comprising: and X-Y digital tablet providing a changing electrostatic field over a plane surface; a stylus movable over the plane surface of the tablet and capacitively coupled thereto for detecting the electrostatic field at predetermined X-Y coordinates; first circuitry connected to said tablet for producing exciting potentials therefor so as to create said field; and second circuitry coupled to said stylus and to said first circuitry for controlling said exciting potentials as a function of the position of the stylus on said surface and in which said second circuitry controls said exciting potentials so as to produce a null in the electrostatic field at the position of the stylus.

* * * * *